United States Patent
Buffington et al.

(10) Patent No.: US 9,288,215 B2
(45) Date of Patent: Mar. 15, 2016

(54) UTILIZING ROUTING FOR SECURE TRANSACTIONS

(71) Applicant: Itron, Inc., Liberty Lake, WA (US)

(72) Inventors: John E. Buffington, Hauser, ID (US); Michael T. Garrison Stuber, Newman Lake, WA (US); Jorjeta G. Jetcheva, San Jose, CA (US)

(73) Assignee: ITRON, INC., Liberty Lake, WA (US)

(*) Notice: Subject to any disclaimer, the term of this patent is extended or adjusted under 35 U.S.C. 154(b) by 81 days.

(21) Appl. No.: 13/790,484

(22) Filed: Mar. 8, 2013

(65) Prior Publication Data

US 2014/0259107 A1   Sep. 11, 2014

(51) Int. Cl.
*H04L 29/06* (2006.01)
*G06F 21/44* (2013.01)

(52) U.S. Cl.
CPC ............... *H04L 63/12* (2013.01); *G06F 21/44* (2013.01); *H04L 63/18* (2013.01)

(58) Field of Classification Search
CPC ........ H04L 63/12; H04L 63/08; H04L 63/123
See application file for complete search history.

(56) References Cited

U.S. PATENT DOCUMENTS

| | | | |
|---|---|---|---|
| 5,539,736 A | 7/1996 | Johnson et al. | |
| 5,794,009 A | 8/1998 | Coleman et al. | |
| 6,005,759 A | 12/1999 | Hart et al. | |
| 6,032,203 A | 2/2000 | Heidhues | |
| 6,100,817 A | 8/2000 | Mason, Jr. et al. | |
| 6,256,128 B1 | 7/2001 | Lavoie et al. | |
| 6,333,975 B1 | 12/2001 | Brunn et al. | |
| 6,396,839 B1 | 5/2002 | Ardalan et al. | |
| 6,510,464 B1 | 1/2003 | Grantges, Jr. et al. | |
| 6,657,552 B2 | 12/2003 | Belski et al. | |
| 6,978,308 B2 | 12/2005 | Boden et al. | |
| 6,993,037 B2 | 1/2006 | Boden et al. | |
| 7,046,682 B2 | 5/2006 | Carpenter et al. | |
| 7,061,924 B1 | 6/2006 | Durrant et al. | |
| 7,117,526 B1 | 10/2006 | Short | |
| 7,274,305 B1 | 9/2007 | Luttrell | |
| 7,304,586 B2 | 12/2007 | Wang et al. | |

(Continued)

FOREIGN PATENT DOCUMENTS

| | | |
|---|---|---|
| GB | 2 414 642 | 11/2005 |
| GB | 2419785 | 5/2006 |

(Continued)

OTHER PUBLICATIONS

Machine translated abstract of KR 2004-0100160.

(Continued)

*Primary Examiner* — Izunna Okeke

(57) ABSTRACT

The present disclosure relates to methodologies, networks, and nodes for providing secure transaction routing among network components. Network transactions (messages) may be intentionally routed though networks using different paths where the act of following the particular node paths or traversing particular nodes provides a security enhancing feature for the messages. A transaction receiving node will examine the paths taken from a sending node to determine if the paths correspond to predetermined paths to verify the authenticity of the transaction. In some embodiments, predetermined paths may change in a predetermined sequence where the sequence itself becomes a portion of the security feature.

33 Claims, 2 Drawing Sheets

(56) References Cited

U.S. PATENT DOCUMENTS

| | | |
|---|---|---|
| 7,312,721 B2 | 12/2007 | Mason, Jr. et al. |
| 7,400,264 B2 | 7/2008 | Boaz |
| 7,401,120 B2 | 7/2008 | Wallbeck et al. |
| 7,499,762 B2 | 3/2009 | Khorramshahi |
| 7,535,917 B1 | 5/2009 | Son |
| 7,616,656 B2 | 11/2009 | Wang et al. |
| 7,623,500 B2 | 11/2009 | Rittinen et al. |
| 7,741,976 B2 | 6/2010 | Crider et al. |
| 8,125,998 B2 | 2/2012 | Anto Emmanuel |
| 2004/0113810 A1 | 6/2004 | Mason et al. |
| 2004/0120357 A1 | 6/2004 | Kekki |
| 2004/0138786 A1 | 7/2004 | Blackett et al. |
| 2005/0240540 A1 | 10/2005 | Borleske et al. |
| 2006/0071812 A1 | 4/2006 | Mason et al. |
| 2006/0077999 A1 | 4/2006 | Kagan et al. |
| 2006/0105741 A1 | 5/2006 | Suh et al. |
| 2007/0008972 A1 | 1/2007 | Sifnatsch et al. |
| 2007/0013547 A1 | 1/2007 | Boaz |
| 2007/0268920 A1 | 11/2007 | Allard-Jacquin et al. |
| 2008/0074285 A1 | 3/2008 | Guthrie |
| 2008/0144548 A1 | 6/2008 | Shuey et al. |
| 2008/0151916 A1 | 6/2008 | Jetcheva et al. |
| 2008/0219210 A1 | 9/2008 | Shuey et al. |
| 2008/0310427 A1* | 12/2008 | West ............................ 370/400 |
| 2009/0034419 A1* | 2/2009 | Flammer et al. ............. 370/238 |
| 2010/0278187 A1 | 11/2010 | Hart et al. |
| 2014/0036735 A1* | 2/2014 | Hall et al. .................... 370/276 |

FOREIGN PATENT DOCUMENTS

| | | |
|---|---|---|
| KR | 10-2004-0100160 | 12/2004 |
| WO | WO 2008/044581 | 4/2008 |

OTHER PUBLICATIONS

PCT Search Report and Written Opinion mailed Jun. 17, 2014 for PCT Application No. PCT/US14/22009, 10 Pages.

Vogt, "Exploring Message Authentication in Sensor Networks", LNCS 3313, Springer-Verlag Berlin Heidelberg, 2005, pp. 19-30.

Zhang, et al., "Secure Routing Based on the Neighbor Table in Wireless Sensor Networks", 2010 3rd IEEE International Conference on Broadband Network and Multimedia Technology (IC-BNMT), Oct. 26, 2010, pp. 1084-1088.

Zhao, et al., "Interactive Informatics on Internet Infrastructure", 10th IFIP/IEEE International Symposium on Integrated Network Management, May 1, 2007, pp. 90-99.

* cited by examiner

UTILIZING ROUTING FOR SECURE TRANSACTIONS

FIELD OF THE SUBJECT MATTER

The present disclosure relates to secure communications. More particularly, the present disclosure relates to methodologies and related and/or associated apparatus for providing enhanced security for transactions between network devices.

BACKGROUND OF THE SUBJECT MATTER

Ensuring secure transactions between two computing devices is a prime concern within the Smart Grid market and within the numerous other consumer-based markets. The primary goal of the various security suites is to ensure any two end computing devices authorize and authenticate each other, and ensure their conversations (communications transactions) are kept secure. With regard to the latter, there are well known techniques available to eavesdrop on transactions without anyone's knowledge.

Figure 1:
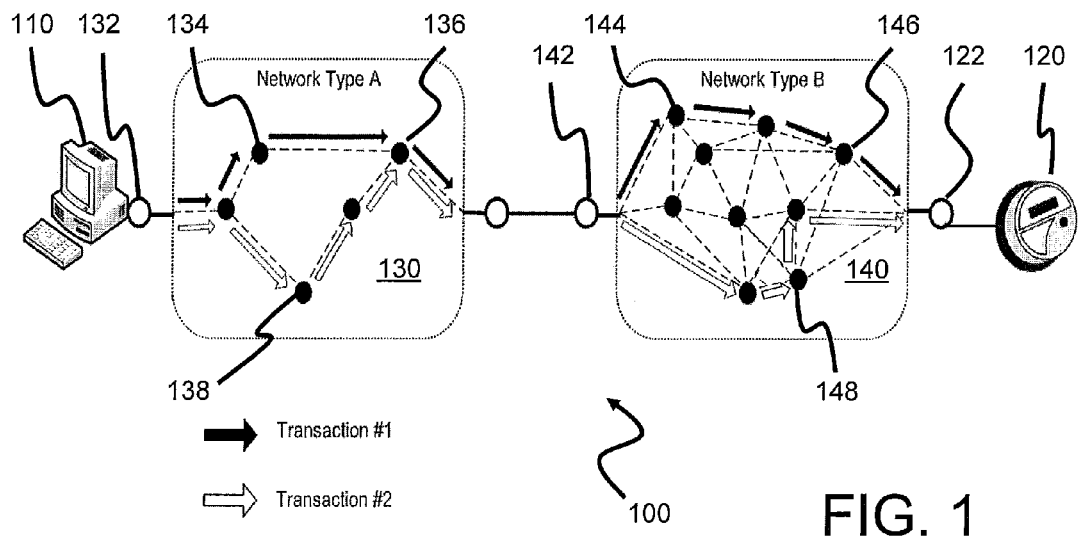
FIG. 1 is an exemplary block diagram of a meter reading system depicting examples of different routing for transactions within a system network in accordance with the present disclosure.

Repeat use of reference characters throughout the present specification and appended drawings is intended to represent same or analogous features, elements, or steps.

DETAILED DESCRIPTION OF THE SUBJECT MATTER

The present disclosure is particularly concerned with secure transaction routing technology.

Selected combinations of aspects of the disclosed technology correspond to a plurality of different embodiments of the present disclosure. It should be noted that each of the exemplary embodiments presented and discussed herein should not insinuate limitations of the present disclosure. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to preferred embodiments of the present disclosure regarding secure transaction routing methodology and corresponding and/or associated apparatus. The illustrative examples provided are not intended to be exhaustive or to limit the present disclosure to the precise forms disclosed. Similarly, any steps or devices described may be interchangeable with other steps or devices, or combinations of steps or devices, in order to achieve the same or substantially similar result.

Although not required, several aspects of the present disclosure are described in the general context of computer-executable instructions, such as routines executed by a general-purpose computer (e.g., a server computer, wireless device, or personal/laptop computer). Those skilled in the relevant art will appreciate that aspects of the present disclosure can be practiced with other communications, data processing, or computer system configurations, including Internet appliances, hand-held devices (including personal digital assistants (PDAs)), wearable computers, cellular or mobile phones, embedded computers (including those coupled to vehicles), programmable consumer electronics, set-top boxes, network PCs, mini-computers, mainframe computers, meters, and the like.

Several aspects of the present disclosure can be embodied in a special purpose computer or data processor that is specifically programmed, configured, or constructed to perform one or more of the computer-executable instructions explained in detail. Several aspects of the present disclosure can also be practiced in distributed computing environments where tasks or modules are performed by remote processing devices, which may be linked through a communication network. In a distributed computing environment, program modules may be located in both local and/or remote memory storage devices.

Routing protocols for transactions across the myriad of networks available today are generally designed to be as efficient and robust as possible. Often, the protocols and techniques employed are designed to ensure that the shortest routes available are used, thereby helping to improve or maintain communications performance. Such capability is often supported within individual networks like certain RFLan systems provided by the owner of the present disclosure, which uses meshing techniques to maintain performance and robustness. Such capability may be further expanded by modern "Route Over" protocols which can extend the transaction routing with the intent of providing seamless communications across the various and multiple network types. Technology of the present disclosure intends to utilize inherent and often programmatically intelligent routing knowledge to help ensure secure communication transactions.

In accordance with one aspect of the present disclosure, communications security aspects within a network are improved by intentionally using the existing routing knowledge to inject alternative message route selections. Such intentional injection may be provided both within and across network types and layers. In accordance with the present disclosure, injection of alternative message routes will reduce eavesdropping and message injection opportunities. The process of intentional alternative message route injection can be applied at both the overall transaction process (one transaction to the next) and at the routing selections used by the multiple sub-messages that make up the overall message transaction process.

With reference to FIG. 1, there is illustrated an exemplary block diagram of a meter reading system 100 generally depicting different routing for transactions within a network in accordance with the present disclosure. FIG. 1 portrays an example of two different transactions, Transaction #1 illustrated by solid arrows, and Transaction #2 illustrated by hollow arrows, that may occur between a representative PC server 110 and a representative electricity meter 120. For security purposes, the selected routes that cross over and through the two types of networks are unique or somewhat random for each transaction. Such fact does not imply selection of poor routing paths that lead to failed communications, but rather utilizing intelligent routing capabilities to select the top performing routes that also allow a random message path delivery. In some instances, it may be practiced to use an intentional path that is perhaps not optimal but otherwise still successful, to serve as a security marker. Per the present disclosure, the end result prevents or reduces eavesdropping and message injection concerns.

In the exemplary meter reading system 100, a personal computer (PC) 110 or other computing device or system may be coupled to a first type network 130 (Network Type A) through which communications packets may travel by various routes. Different transactions (messages) may navigate through network 130 in different paths as indicated by the solid and hollow arrows illustrated and represented in FIG. 1. In navigating through network 130, a first exemplary transaction may follow a path through nodes 134 and 136 while a second exemplary transaction may follow a path through node 138. In a similar fashion, transactions (messages) passing from node 142 into network 140 (Network Type B) may navigate a path through nodes 144 and 146 to reach node 122 or, alternatively, may pass through node 148. Transactions passing from PC 110 and node 132 may pass through networks 130 and 140 using various combinations of paths.

It should be appreciated that although the presently described exemplary implementations are described in relation to a utility metrology communications network, specifically as an example of a network operated by the owner of the present disclosure, the capabilities of the present disclosure may well be applied to other communications security solutions outside of such networks. Examples of other environments include, but are not limited to, corporate communications networks, governmental and military networks, and industrial communications networks where enhanced communications security is desired.

The present disclosure may be implemented in several ways, in various presently disclosed embodiments. In a first exemplary embodiment of the present disclosure, a straightforward approach may be taken using a detective control. For example, consider two nodes 122, 142 linked over a mesh network 140, for example Network Type B as illustrated/represented in FIG. 1. Nodes 122 and 142 could negotiate details about expected routing patterns they will use. For example, they might determine that the optimum path can traverse one of four different paths. They might agree to use those paths on a particular rotating sequence, such that path 1 is always followed by path 2, then path 3, and then path 4. In the event that node 122 receives a message from node 142 that did not use the appropriate path, Node 122 could reject the message, or request a re-authentication from node 142 before accepting it. A potential or attempting attacker would not be aware of the requirement to use such rotating path sequence and their messages could be rejected. Variants of such particular embodiment of the present disclosure could include routing through particular nodes, or utilizing particular hop counts. While relying on a particular routing pattern alone would likely be insufficient to provide adequate or desired security at least in some instances, such mechanism would make it much more difficult for an outsider or unauthorized party to launch a direct network attack.

In a second exemplary embodiment of the present disclosure, an approach somewhat similar to, but different from, that known as "port knocking" used on some Internet devices may be employed. In computer networking, "port knocking" is a method of externally opening ports on a firewall by generating a connection attempt on a set of pre-specified closed TCP/IP ports within a short window of time. Once a correct sequence of connection attempts is received, the firewall rules are dynamically modified to allow the host which sent the connection attempts to connect over one or more specific TCP/IP ports. In accordance with such second exemplary embodiment when used in conjunction with the present disclosure, node 122, for example, may be programmed to take some action (for example, allow packets from node 132 coupled to PC 110 to query or otherwise control electricity meter 120), but only after node 132 has sent a series of messages that traverse particular nodes through one or both of networks 130 and 140, or whose routing design matches particular criteria.

In a third exemplary embodiment of the present disclosure, a multi-path routing mechanism may be used to validate secure routes. In accordance with such third embodiment of the present disclosure, validation may be performed by periodically sending the same packet over multiple routes and comparing the received packets at the destination. In such manner, detection of possible attacker-modified packets or attacker modified message routing may be achieved.

The discussion provided above with reference to FIG. 1 is intended as a general description of one representative or exemplary meter reading system 100 capable of implementing various features of the present disclosure. While the description above is made with reference to particular devices linked together through different interfaces, those skilled in the art will appreciate that the claimed subject matter may be implemented in other contexts. In such regard, the present disclosure may be practiced using different types of devices and communication interfaces than those illustrated in representative FIG. 1.

Figure 2:
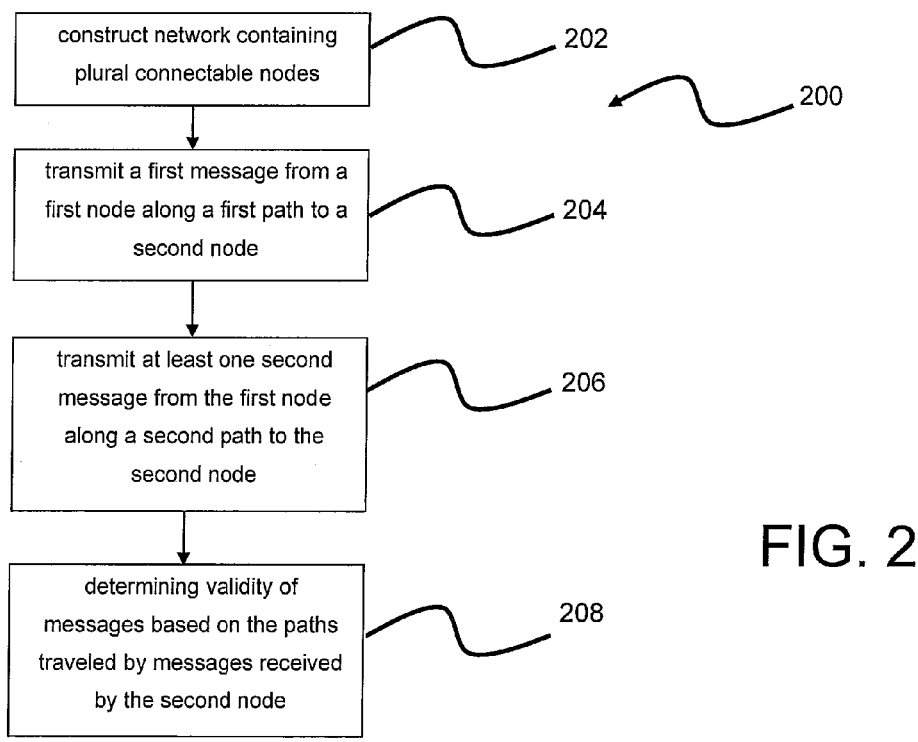
FIG. 2 in an exemplary flow chart illustrating exemplary methodology of operation of the present disclosure.

Referring now to FIG. 2, there is illustrated a flow chart 200 generally illustrating exemplary methodology under which the present disclosure may operate. As illustrated and represented in FIG. 2, at step 202 one or more networks containing plural connectable nodes are constructed. Such networks may be of different type but all contain plural nodes that may be connected together in paths to form communications links between network nodes.

At step 204 in accordance with exemplary presently disclosed methodology, a first message may be transmitted from a first node along a path to a second node. At step 206 at least one second message is transmitted from the first node to the second node along a second path. The first and second paths may be predetermined paths arranged by negotiations respectively between a sending and receiving, that is, a first and second, node. The nodes may also negotiate other criteria including, without limitation, the paths to be taken by transmitted messages between the first and second nodes, the number of and particular address (location) of selected nodes, the number of hops along the paths, and/or other criteria as generally discussed herein with reference to FIG. 1.

At step 208, a determination is made regarding the validity of messages received at the second (receiving) node. Determination of validity of received messages may include an analysis of the paths and/or nodes traversed by messages. In some instances, a determination may be made based on transmission of plural messages or segments of a single message along predetermined paths and/or through predetermined nodes. In other embodiments, a determination of validity may be made by determining whether a preliminary message has been received by the receiving node based on paths and/or nodes traversed before an actual message is allowed to be received at a receiving node.

Figure 3:
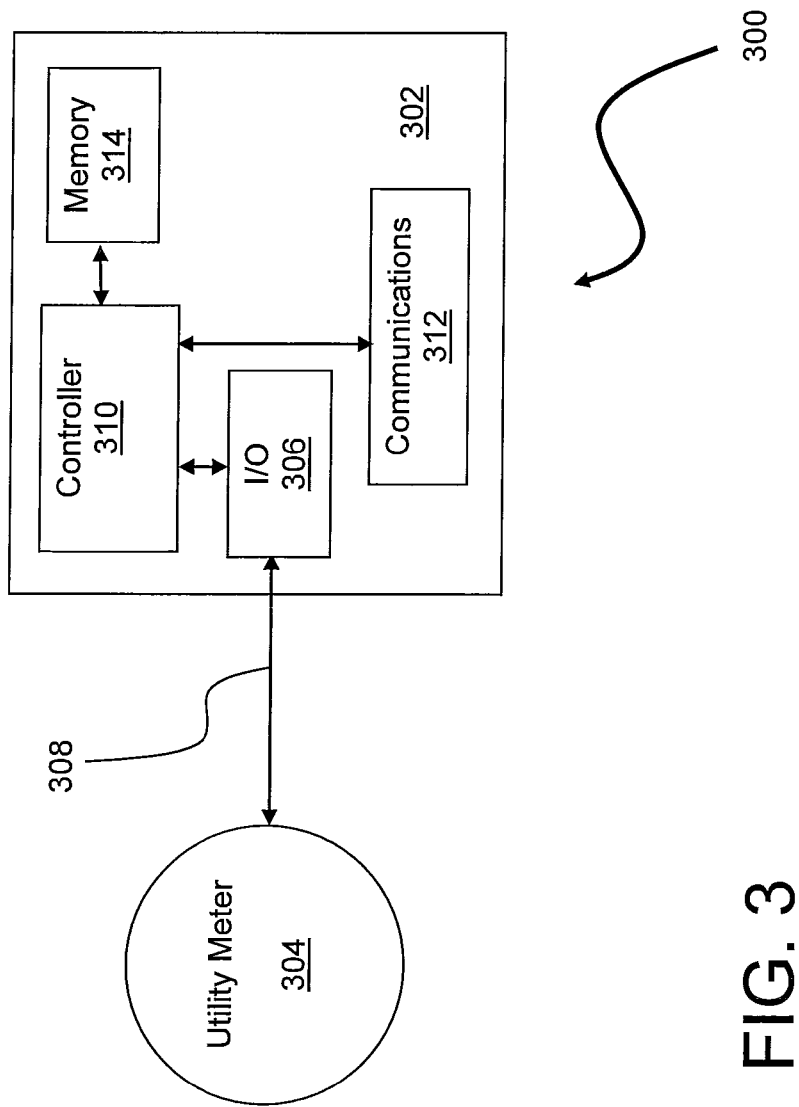
FIG. 3 is an illustration of an exemplary node device as may be used within the representative network illustrated in FIG. 1 and operated in accordance with the exemplary methodology illustrated in FIG. 2.

With respect to FIG. 3, there is illustrated an exemplary node 300 generally that may be used within the representative network 100 illustrated in FIG. 1 and operated in accordance with the exemplary methodology 200 represented in FIG. 2. Node 300 may correspond to at least a first component 302 and, in some embodiments, a second component 304 that may correspond to a utility meter. In exemplary embodiments, component 304 may correspond to an electric, gas, water, heat, thermal energy, or oil meter (or in some instances, otherwise involving or associated with the delivery of some other commodity or service, such as cable television).

Component 302 of node 300 may include several subcomponents including such as an input/output (I/O) device 306 that, in some embodiments, may be used to couple component 304 (utility meter) via connection line 308 to associated components within component 302, such as including controller 310, communications device 312, and memory 314. Controller 310 may correspond to a processor, microprocessor, integrated circuit device, or some other device capable of controlling operations necessary within node 300 to send and receive information by way of communications device 312 to and from other nodes in a network based on various data received and/or sent to and/or from component 304 (utility meter) and other nodes within an associated network such as that illustrated in FIG. 1. Communications device 312 may correspond to a wired or wireless device, for example, a transceiver capable of wirelessly transmitting and receiving information from other network nodes.

It should be appreciated that while node 300 is presently illustrated as corresponding to two components 302, 304, such is exemplary, representative only. In fact, component 302 may be wholly contained within component 304 and as such may correspond more generally to electricity meter 120 illustrated in FIG. 1. More generally, component 302 may form the entirety of node 300 where the general function of such a configured node may be to relay communications from other nodes within a network, or rather than either a meter or relay, a node may comprise such as a distribution automation device.

In operation, node 300 may receive messages by way of communications device 312 from other nodes in a network including, for example, PC 110 illustrated in FIG. 1. Such messages may be of a control nature such as to instruct component 304 to perform some action such as, without limitation, to either disconnect or to re-establish service to a consumer, to instruct component 304 (utility meter) to transmit consumption and/or other information, or to change parameters, including, without limitation, settings or software, within component 304.

Given the broad nature of control which component 302 is capable of exercising over component 304, it is generally desirable that component 302 be programmed or configured to examine received data to insure that such data is valid. In accordance with aspects of the present disclosure, component 302, or, more specifically, memory 314 within component 302, may be configured to hold instructions in the form of software or program logic to cause component 302 to examine data received by way of communications device 312 to insure that such data is valid.

In performing such examination of incoming data, component 302 may operate using some or all of the methods previously described with respect to FIG. 2 including evaluating paths and nodes taken by arriving messages, the number and specific ones of nodes and/or paths such messages have passed through, and whether valid preliminary messages have been received before permitting a control or other type of message to be received. Other forms of validation as otherwise discussed herein may also be conducted.

Those of ordinary skill in the art should appreciate that the present subject matter may be practiced with different or alternative embodiments (encompassing both methodology and corresponding and/or related apparatus). For example, some embodiments may omit the above-described second message, and instead provide some information alternatively to nodes out of band (or network). For example, a set of devices could be programmed to require them to send packets (messages) through a particular node known to be on the network. Such programming for such set of devices could be done during manufacturing or could further include using at least one of an out-of-band mechanism, including one of optical, wired, or wireless communication, or a smart card, or an in-band mechanism through a trusted third party, including one of a router or host application that is aware of the network paths. Messages that did not traverse that device could then be otherwise rejected. An exemplary such methodology for validating messages transmitted through a network could involve a network containing plural nodes connectable to form plural paths for communications transactions, and comprise transmitting a first message from a first node along a first path to a second node; and determining validity of the first message based at least in part on the first path traveled by messages received by the second node. Such determination of validity could comprise determining whether the first path encompasses a particular node known to be on the network. In alternatives, it could further comprise rejecting messages whenever it is determined that the first path does not encompass a particular node known to be on the network. In still others, it may further comprise requesting reauthentication from a transmitting node for rejected messages. In such alternative embodiments, the first message may comprise a sub-message of an overall message.

While the present disclosure has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such.

What is claimed is:

1. Methodology for validating messages transmitted through a network, the network containing plural nodes connectable to form plural paths for communications transactions, comprising:
   selecting first and second paths according to a rotating sequence of routing paths between a first node and a second node;
   receiving a first message from the first node along a first path to the second node;
   receiving at least one second message from the first node along a second path to the second node;
   determining validity of at least one of the first message and the at least one second message based at least in part on the paths traveled by messages received by the second node, wherein determining the validity comprises comparing the paths taken by the first message and the at least one second message to determine whether the paths correspond to predetermined paths consistent with the rotating sequence of routing paths; and
   requesting reauthentication from the first node for messages arriving by paths other than the predetermined paths.

2. Methodology as in claim 1, wherein determining validity further comprises comparing the first message and the at least one second message to determine whether they are identical.

3. Methodology as in claim 1, wherein determining validity further comprises determining whether the first and at least one second message predetermined paths include a predetermined number of hops.

4. Methodology as in claim 1, wherein the first message and the at least one second message comprise sub-messages of an overall message.

5. Methodology as in claim 1, wherein determining validity further comprises determining whether at least one of the first message and the at least one second message passed through one or more predetermined nodes.

6. Methodology as in claim 1, wherein plural nodes negotiate between each other the routing paths to be used for communications therebetween.

7. Methodology as in claim 1, wherein:
the first message and the at least one second message are identical messages; and
determining validity comprises determining whether the identical messages have been sent via plural predetermined paths.

8. Methodology as in claim 1, wherein:
the first message and the at least one second message are identical messages; and
determining validity comprises determining whether the identical messages have been received by the second node from plural predetermined nodes.

9. Methodology as in claim 1, wherein:
the first message comprises plural preliminary messages transmitted through particular nodes; and
wherein determining validity comprises determining whether the particular nodes correspond to predetermined nodes.

10. Methodology as in claim 1, wherein:
the first message comprises plural preliminary messages transmitted through particular paths; and
wherein determining validity comprises determining whether the particular paths correspond to predetermined paths to thereby permit passage of the at least one second message to the second node.

11. A network, comprising:
a first node;
a second node; and
a plurality of nodes connectable to form plural paths for communications transactions between said first node and said second node;
wherein said first node is configured to transmit a first message and at least one second message along one or more paths through said plurality of nodes to said second node and wherein said second node is configured to request reauthentication from said first node for messages arriving by paths other than predetermined paths; and
wherein said second node is configured to determine validity of at least one of said first message and said at least one second message based at least in part on the paths traveled by messages received by the second node, and wherein said second node determines validity of said messages based at least in part on a number of hops in the paths traveled by messages received by the second node.

12. A network as in claim 11, wherein said second node is configured to determine validity of message based on whether said first message and said at least one second messages are identical.

13. A network as in claim 11, wherein the first node and second node are configured to negotiate the predetermined paths for messages therebetween.

14. A network as in claim 13, wherein said second node is configured to determine validity of said messages by determining whether the predetermined paths include at least one predetermined node.

15. A network as in claim 11, wherein said first message and said at least one second message comprise sub-messages of an overall message.

16. A network as in claim 11, wherein said network comprises a mesh network.

17. A network as in claim 11, wherein said network comprises plural types of connected networks.

18. A network as in claim 11, wherein at least one of said first node and said at least one second node each comprise respective utility measurement devices.

19. A node for use in a network environment with one or more other nodes, comprising:
an input/output (I/O) component;
a controller component;
a communications device; and
a memory;
wherein said memory contains program logic to cause said controller to:
negotiate with other nodes to establish a rotating sequence of routing paths to be used for communications therebetween;
compare paths taken by a first message and at least one second message to determine whether the paths correspond to predetermined paths consistent with the rotating sequence of routing paths;
validate received data based in part on paths taken by the first message and taken by the at least one second message received at said communications device, wherein the validation is based at least in part on the comparing; and
request re-authentication from a transmitting node for messages arriving by paths other than the predetermined paths.

20. A node as in claim 19, wherein said memory further contains program logic to cause said controller to validate received data by comparing the first received message and the at least one second received message to determine whether they are identical.

21. A node as in claim 19, wherein said memory further contains program logic to cause said controller to validate received data by comparing a first received message and at least one second received message to determine whether said paths taken correspond to predetermined paths.

22. A node as in claim 21, wherein said memory further contains program logic to cause said controller to validate received data by comparing a first received message and at least one second received message to determine whether the first and at least one second message predetermined paths include a predetermined number of hops.

23. A node as in claim 19, wherein said memory further contains program logic to cause said controller to determine whether at least one of the first message and the at least one second message passed through one or more predetermined nodes.

24. A node as in claim 19, wherein said memory further contains program logic to cause said controller to determine whether identical received messages have been sent via plural predetermined paths.

25. A node as in claim 19, wherein said memory further contains program logic to cause said controller to determine whether identical received messages have been sent via plural predetermined nodes.

26. A node as in claim 19, wherein:
said first message comprises plural preliminary messages transmitted through particular nodes; and
wherein validating received data comprises determining whether the particular nodes correspond to predetermined nodes to thereby permit passage of the at least one second message to the second node.

27. Methodology for validating messages transmitted through a network, the network containing plural nodes connectable to form plural paths for communications transactions, comprising:
- selecting first and second paths according to a rotating sequence of routing paths between a first node and a second node;
- transmitting a first message from the first node along the first path to the second node;
- determining validity of the first message based at least in part on the first path, a number of hops in the first path, and consistency of the first path within the rotating sequence of routing paths; and
- requesting reauthentication from a transmitting node for messages determined to be invalid.

28. Methodology as in claim 27, wherein determining validity comprises determining whether the first path encompasses a particular node known to be on the network.

29. Methodology as in claim 28, wherein determining validity further comprises rejecting messages whenever it is determined that the first path does not encompass the particular node known to be on the network.

30. Methodology as in claim 27, wherein the first message comprises a sub-message of an overall message.

31. Methodology as in claim 27, further comprising programming a set of devices associated with the network to send packets through a particular node known to be on the network.

32. Methodology as in claim 31, wherein such programming for such set of devices is done during manufacturing or further includes using at least one of an out-of-band mechanism, including one of optical, wired, or wireless communication, or a smart card, or an in-band mechanism through a trusted third party, including one of a router or host application that is aware of the network paths.

33. Methodology for validating messages transmitted through a network, the network containing plural nodes connectable to form plural paths for communications transactions, comprising:
- selecting first and second paths according to a rotating sequence of routing paths between a first node and a second node;
- receiving a first message from the first node along a first path to the second node;
- receiving at least one second message from the first node along a second path to the second node; and
- determining validity of at least one of the first message and the at least one second message based at least in part on the paths traveled by messages received by the second node, wherein determining the validity comprises comparing the paths taken by the first message and the at least one second message to determine whether the paths correspond to predetermined paths consistent with the rotating sequence of routing paths;
- wherein the plural nodes negotiate between each other the rotating sequence of routing paths to be used for communications therebetween.

* * * * *